UNITED STATES PATENT OFFICE.

WILLIAM F. ELY, OF NEW YORK, N. Y.

IMPROVEMENT IN PREPARING INDIA-RUBBER.

Specification forming part of Letters Patent No. 5,069, dated April 17, 1847.

*To all whom it may concern:*

Be it known that I, WILLIAM F. ELY, of the city of New York, in the State of New York, have invented certain new and useful Improvements in the Manner of Preparing and Compounding Caoutchouc or India-Rubber for Manufacture; and I hereby declare that the following is a full and exact description thereof.

My improvement consists in the treatment of the compound of calcined magnesia or the carbonate of magnesia and india-rubber by submitting the compound thus formed to the action of heat or steam at a regulated temperature, by which exposure of such compound to heat it will be so far altered in its qualities as not to become softened by the action of the sun or of artificial heat, nor will it be injuriously affected by exposure to cold. It will lose the adhesiveness of india-rubber. It will also, in a great degree, resist the action of all the known solvents of rubber.

Among the other advantages of this compound under the improved treatment is this, that it may be colored of any dye or hue by the mixture of any coloring-matter which is not in itself changed by the action of the degree of heat required for curing or heating, which is not the case with any of the rubber compounds now in use. It is also lighter, tougher, and harder than any of such other compounds, and may be advantageously used in medical and surgical operations, the action of the magnesia being to destroy or neutralize the deleterious qualities of the native gum.

With this compound, when cheapness is an object, may also be mixed other substances—such as lamp-black, the chromes, the different oxides and carbonates, bitumen, the sulphates and many other substances—without their interfering at all with the process of heating or curing the compound, thus enabling a manufacturer to adapt his compound to the particular purpose or use for which the article is intended.

The materials above named used by me in the compound may be employed in varying proportions; but that which I have found to answer best, and to which it is desirable to approximate in the compound, is the following: I take one ounce of calcined magnesia or two ounces of the carbonated magnesia to one pound of india-rubber and grind and mix them together in any of the usual ways, and roll the compound out in any of the usual and well-known manners in sheets of required thickness. The flour of sulphur may be mixed with the rubber or the solvent (about two ounces of sulphur to a pound of rubber) to act as a drier, but consider the best way to use it to be to coat the surfaces of the sheets of the compound above described with the flour by sprinkling on as much as will adhere.

I would here state that by mixing a larger proportion of magnesia with the rubber a harder and stiffer compound can be produced when desired.

This compound of india-rubber and magnesia or its carbonate with sulphur, added as above and in sheets, should then be subjected to the action of a high degree of temperature which will admit of great variation, steam heat being greatly preferred by me, and when steam is used I consider a temperature of about 260° of Fahrenheit to be the best. The steam is to be applied in any convenient manner, and the period of its subjection to the steam should be from one to three hours, according to the thickness of the sheets of the compound and the quality of the rubber. After this process I subject my goods to the action of a solution of alkali (preferring on account of its cheapness that of boiling potash) to remove the sulphur.

Having thus fully described the nature of the process by which I prepare my improved india-rubber fabric, I do hereby declare that I do not claim the use of sulphur as a drier as used for the purposes above declared, nor of the application of artificial heat or steam, nor simply the compound of magnesia and rubber; but

I do claim—

The combination of calcined magnesia or the carbonate of magnesia with india-rubber when the fabric is cured by the heating process, and in combination therewith, so as to form a new fabric with a compound either in the proportions above named or in any other within such limits as will produce a like result.

In witness whereof I have hereunto subscribed my name this 6th day of November, 1846.

WILLIAM F. ELY.

Witnesses:
    JOSEPH STRONG,
    G. GAY.